United States Patent [19]

Feng

[11] 4,237,730
[45] Dec. 9, 1980

[54] FLUID VELOCITY MEASUREMENT SYSTEM

[75] Inventor: Chung L. Feng, Wayne, Pa.

[73] Assignee: Selas Corporation of America, Dresher, Pa.

[21] Appl. No.: 942,865

[22] Filed: Sep. 15, 1978

[51] Int. Cl.³ .................. G01F 1/68; G01F 1/70
[52] U.S. Cl. ........................................ 73/204
[58] Field of Search ..................................... 73/204

[56] References Cited

U.S. PATENT DOCUMENTS

| | | | |
|---|---|---|---|
| 3,329,017 | 7/1967 | Yamamoto et al. | 73/194 |
| 3,399,566 | 9/1968 | Brown | 73/204 |
| 3,820,393 | 6/1974 | McGunigle | 73/204 |
| 3,922,912 | 12/1975 | Bradbury et al. | 73/204 |

FOREIGN PATENT DOCUMENTS

| | | | |
|---|---|---|---|
| 2723809 | 12/1977 | Fed. Rep. of Germany | 73/204 |
| 1084653 | 9/1967 | United Kingdom | 73/204 |

*Primary Examiner*—Herbert Goldstein
*Attorney, Agent, or Firm*—Miller & Prestia

[57] ABSTRACT

A fluid velocity measurement system includes a thermal generation means operated for short durations of time and disposed within a conduit suitable for guiding at least a portion of a fluid whose velocity is to be determined. Disposed downstream in the fluid guide means is at least one of a first and second thermal sensing means. The sensing means are spaced from each other. The first and second thermal sensing means are differentially coupled. The time period starting with the thermal generation means being turned on and heating a slug of fluid and extending to the generation of a differential electrical signal from the sensing means detecting the heated slug of fluid is the flight time of the heated slug of fluid. In one embodiment of the invention circuitry is provided to measure the actual flight time and divide it into a predetermined period of time resulting in a quotient which is proportional to the fluid velocity. In another embodiment the flight time is measured by a count which is divided into a predetermined count which is equivalent to a quotient also proportional to the fluid velocity. Both embodiments further include means for receiving the quotient and converting it into an appropriate signal to operate a numerical display.

27 Claims, 10 Drawing Figures

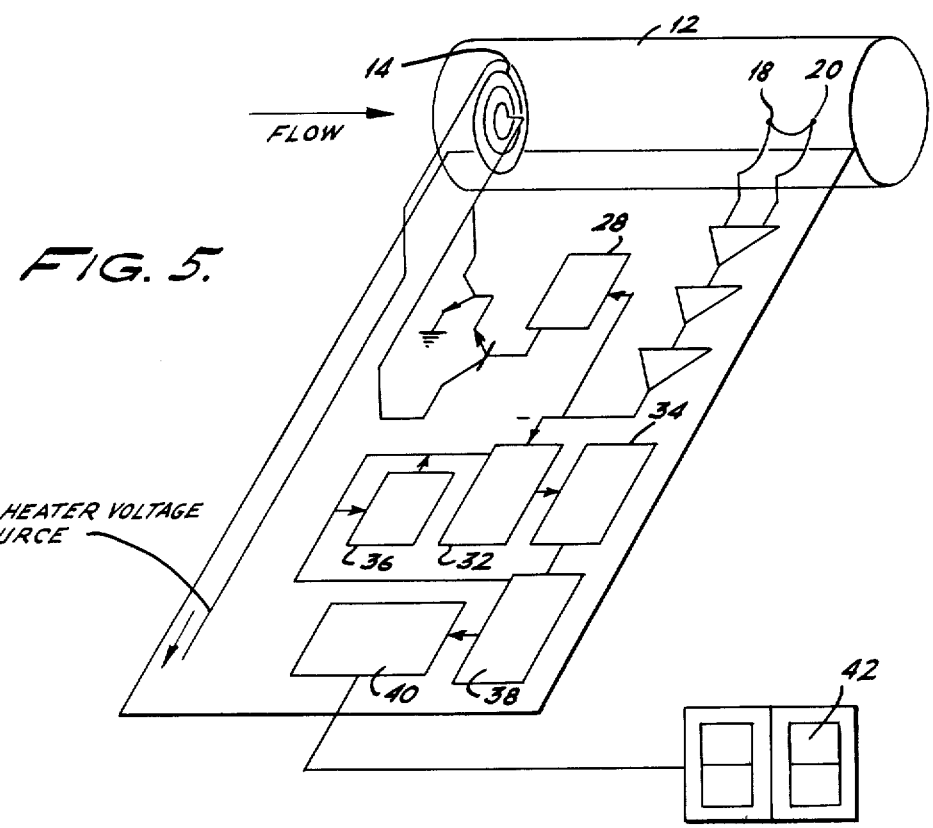
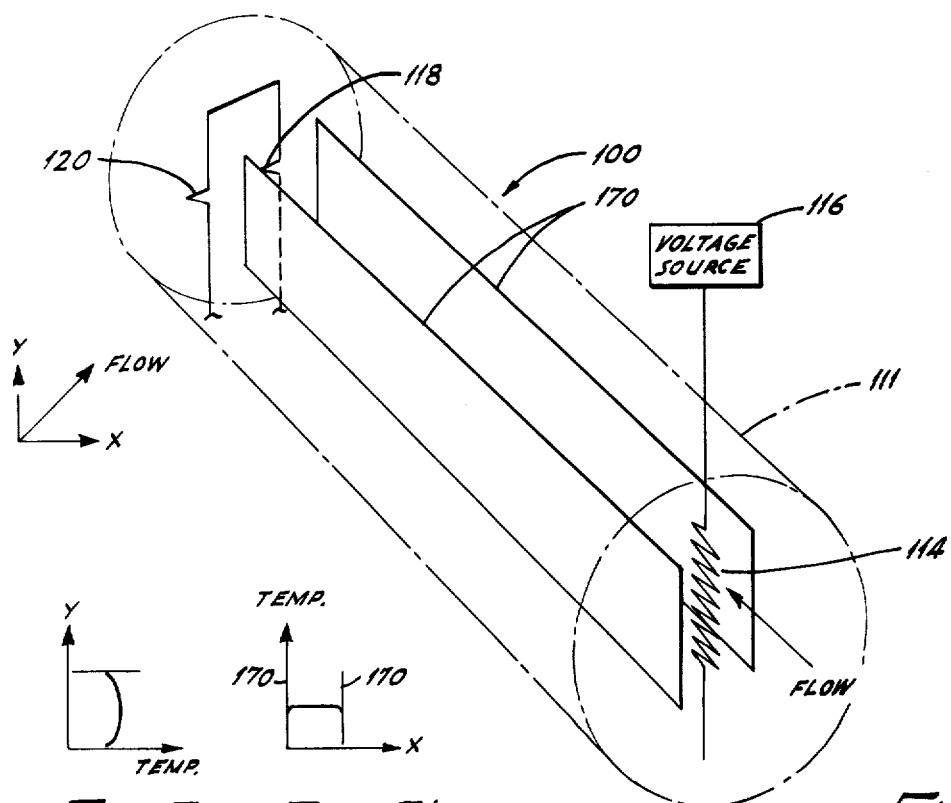
FIG. 5.
FIG. 7a. FIG. 7b. FIG. 6.

FLUID VELOCITY MEASUREMENT SYSTEM

BACKGROUND OF THE INVENTION

The present invention relates to a fluid velocity measurement system and more particularly, a fluid velocity measurement system with regenerative pulses for read-out by counting.

In many applications, especially in industry, the measurement of the velocity of a fluid flowing through a conduit is performed by a mechanical and/or electrical means. Determining fluid velocity by strictly mechanical means, or those means using mechanical movement to some extent, is not the most desirable procedure, since mechanical parts will eventually wear out, bringing about a shutdown of the entire system. A more practical means of measuring fluid velocity is that utilizing strictly electrical means. Some in the past have used electrical means for determining fluid velocity, however, they have always required rather complicated electrical circuitry and were designed to measure velocity under specific conditions. For example, the fluid velocity detector disclosed in U.S. Pat. No. 3,820,393 by R. D. McGunigle, is designed principally for fluid velocity detection in outer space, and that disclosed in U.S. Pat. No. 3,543,578, by R. W. Sampson is principally designed for relatively small fluid rates of fluid flow.

Specifically, the McGunigle patent discloses a velocity measurement system for indicating the time of flight of a fluid carrying signal, which includes means for applying the thermal pulse to the fluid; means for sensing the fluid carrying signal at a downstream tube location and generating an electrical pulse as a signal thereof; means for generating an output voltage signal when the signal pulse is present, a voltage signal having a first polarity when the first electrical pulse has a predetermined polarity and having a polarity opposite the first polarity when the first electrical signal is not of the predetermined polarity. Furthermore, the McGunigle patent discloses means for integrating the output voltage signal and applying the integrated output voltage to a voltage control means to thereby control the duration of the first electrical pulse to effect a known integrated output voltage signal, and means for determining the duration of the first electrical pulse and generating therefrom an informational signal as a function of time of travel of the fluid carried signal from the first location within the tube to the downstream location.

The Sampson patent discloses a flow meter system including a conduit for the passage of fluid; energy inducing means connected to the conduit; a first set of plural energy sensors spaced along the inner wall of the conduit in a manner to measure the induced energy flow between the first set of sensors; a second set of energy sensors spaced substantially along the axis of the conduit in a manner to measure the induced energy flow between the second set of sensors; a time determining means connected to the first and second sensor sets for determining the respective time for the induced energy flow between the sensors; and a read-out means for representing the rate of flow of the fluid. The Sampson patent is especially complicated by the fact that four sensing elements are required to sense the rate of fluid flow.

Therefore, it is most desirable if an electrical fluid velocity measurement system could be designed which would have a more general application than those taught by the prior art, and yet be more simplified in its operation than those of the prior art. The fluid velocity measurement system of the present invention, unlike the prior art, generates a quotient of the flight time of a heated slug of a fluid divided into a predetermined time.

SUMMARY OF THE INVENTION

A fluid velocity measurement system includes a fluid flow guide through which flows at least a portion of the fluid whose velocity is to be determined, a thermal generation means is disposed upstream in the fluid flow guide means which is capable of operation for a period of time to heat a slug of the fluid. First and second thermal sensing means are differentially coupled, and an amplifying means is provided for receiving the differential electrical signal, the result of either or both of the first and second thermal sensing means sensing thermal energy. The amplifier means is capable of emitting an amplified electrical pulse responding to the received differential electrical signal. The period of time from when the thermal generation means is triggered into heating a slug of fluid to when the first and second thermal sensing means emits a differential electrical signal is the flight time of the heated slug of fluid. The system further includes means for measuring the flight time of a heated slug of fluid and dividing this measurement into a predetermined fixed measurement resulting in a quotient which is directly proportional to the velocity of the fluid. Means are further provided for receiving and converting the quotient into electrical signals appropriate for operating a numerical display of the fluid velocity. In another embodiment of the fluid velocity measurement system a pair of spaced apart walls are provided as the fluid flow guide means. The thermal generation means is disposed upstream between the spaced-apart walls, and the walls are adapted as a flow guide to a heated fluid slug. The first fluid sensing means is disposed downstream between the walls of sensing the heated slug of fluid guided by the walls. Disposed sidewise to the first sensing means is the second sensing means for sensing the unheated fluid flow in the containing means. The two sensing means are differentially coupled and their differential electrical signal is sensed by the measuring means as stated above.

In still another embodiment of the present invention the fluid guiding means includes a housing, a main passageway through the housing having a "Y" shaped branch which branches off into a top and bottom passageway. A pressure control chamber is below the passageway and extends at least upstream of the "Y" shaped branch. A control port is substantially vertically disposed with respect to and in communication with the main passageway and the pressure control chamber. A control heater is disposed in the pressure control chamber and the thermal generation means is disposed in the main passageway. Both of the thermal sensing means are disposed in the top passageway. The pressure generated in the pressure control chamber, as a result of activating the control heater, determines whether the fluid flowing through the main passageway will be switched to the top or bottom passageway. The fluid heated by the thermal generation means is thereby capable of being detected in either the top or bottom passageway by either or both of the thermal sensing means.

BRIEF DESCRIPTION OF THE DRAWINGS

FIG. 5 is a schematic representation of the system of the present invention in combination with a printed circuit board showing how the electrical apparatus of the present invention may be laid out thereon, and in combination with a display means.

FIG. 6 is a cross-sectional view of a second embodiment of the fluid velocity measurement system.

FIGS. 7(a) and (b) are graphs of temperature versus direction indicating the substantially uniform temperature distribution of a heated fluid in the second embodiment of the present invention as shown in FIG. 6.

DETAILED DESCRIPTION OF THE INVENTION

Figure 1:
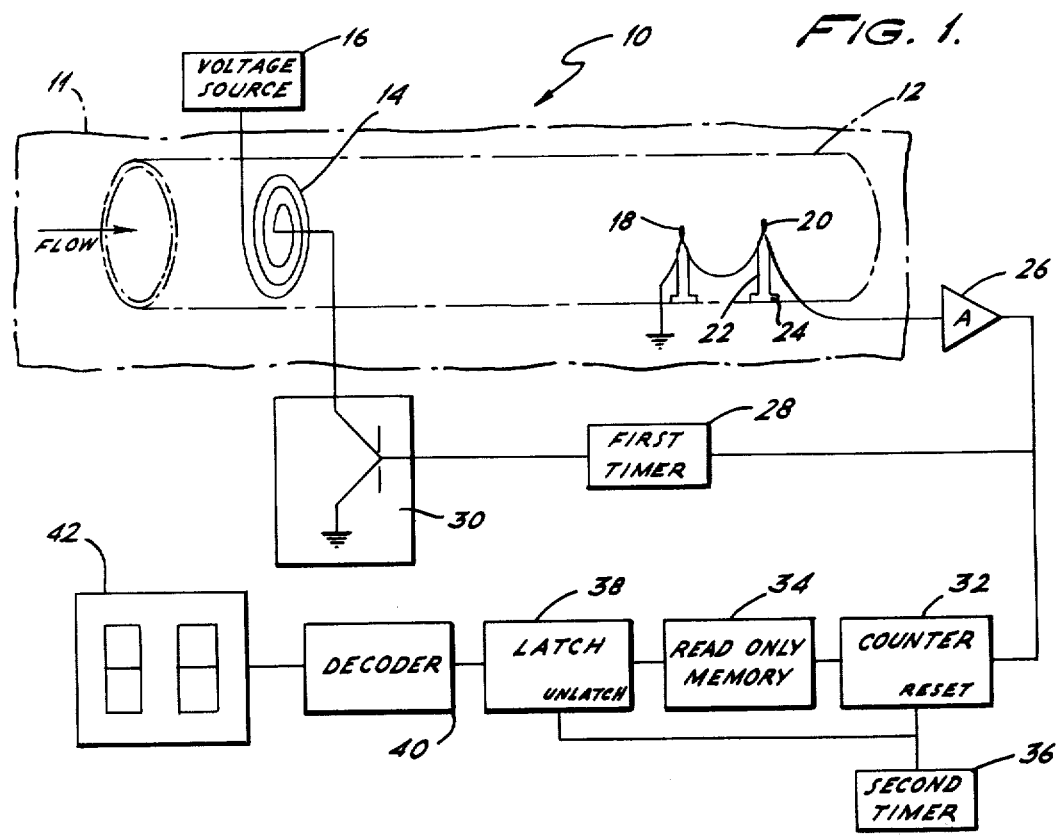
FIG. 1 is a schematic representation of a first embodiment of the fluid velocity measurement system of the present invention.

Referring to FIG. 1, a first embodiment of the fluid velocity measurement system of the present invention is designated as 10. By the term "fluid" it is typically meant either a gas or a liquid. However, for the purpose of explaining the present invention, it is assumed that the fluid is a gas and more specifically air.

The fluid velocity measurement system 10 includes a means 12 for guiding the flow of a fluid therethrough, at least a portion of the fluid whose velocity is to be determined flows through the means 12. As is subsequently described a slug of the fluid is heated in order to determine fluid velocity, and this slug of air is contained in the means 12 and is thereby guided. In the present example the fluid flow guide means 12 is itself within a housing 11 into which flows all the fluid whose velocity is to be determined. However, it is anticipated by the present invention that the means 12 could be the only means for holding the fluid whose velocity is to be determined, and thus no housing 11 is required. For the purpose of describing the present invention, the guiding means 12 is a tubular shaped conduit typically made of glass or an epoxy glass, which minimizes the mixing between heat and unheated fluids. Usually at least one end of the conduit 12 will be open to allow for the expansion of the flowing fluid, however, the conduit 12 itself does protect the fluid flowing therethrough from being affected by outside temperatures.

Disposed within the upstream end of the conduit 12 is a thermal generation means 14. The purpose of the thermal generation means 14 is to operate for a short duration of time in order to heat a slug of the air flowing through the conduit 12. The thermal generation means 14 can be of a conventional type, such as the pancake heater shown in FIG. 1 which is vertically positioned with respect to the air flowing through the conduit 12.

The pancake heater 14 is electrically connected at one of its electrical terminals to a voltage source 16, external to the conduit 12.

Connected to the other electrical terminal of the pancake heater 14, is a switching means 30. Typically, the switching means 30 is a transistor with the emitter lead of the transistor connected to ground. When the transistor is not operating there is an open circuit between the pancake heater 14 and ground, thus, the pancake heater 14 cannot be activated. However, when the transistor of the switching means 30 is activated, it closes the heater 14 circuit, allowing current to flow through the pancake heater 14, thereby activating the panckake heater 14.

The thermal generation means 14 could also be a pair of electrodes disposed within the conduit 12 in a spaced-apart relationship. An electrical arc generated across the electrodes could also be utilized as a means for heating a slug of air passing therethrough. Also, a high resistivity wire can be used as the thermal generation means 14.

Located downstream in the conduit 12 are a first and second thermal sensing means 18 and 20. The first and second thermal sensing means 18 and 20 are disposed along the axis of the conduit 12 with one of the thermal sensing means, i.e., the second thermal sensing means 20, disposed farther downstream in the conduit 12 than the other thermal sensing means, i.e., the first thermal sensing means 18. Each of the thermal sensing means 18 and 20, are mounted on a post 22, which extends from a base plate 24 which is secured to the conduit 12 by conventional means. The first and second thermal sensing means 18 and 20 extend into the conduit 12 in the path of the air flow. (It is subsequently disclosed in another embodiment of the present invention that the first and second sensing means can also be arranged so that only one of said means detects a heated slug of fluid while the other functions as a reference.)

Electrically the first and second sensing means 18 and 20 are differentially coupled to each other with one lead of each sensing means 18 and 20 in contact to each other and a second lead of the first sensing means 18 connected to ground and a second lead of the second sensing means 20 connected to the input of an amplifier means 26.

For the purpose of describing the present invention, each of the thermal sensing means 18 and 20 are conventional thermocouples, however, other temperature sensing means, such as the thermister could also be utilized.

As is well known to those skilled in the art, a thermocouple is an electrical device which converts thermal energy into electrical energy. The electrical signals from the first and second thermocouples 18 and 20 are differentially coupled into the amplifier means 26 and the amplifier means 26 is capable of emitting an amplified electrical pulse which responds to the first thermocouple 18 sensing a heated slug of fluid before the second thermocouple 20.

Figure 2:
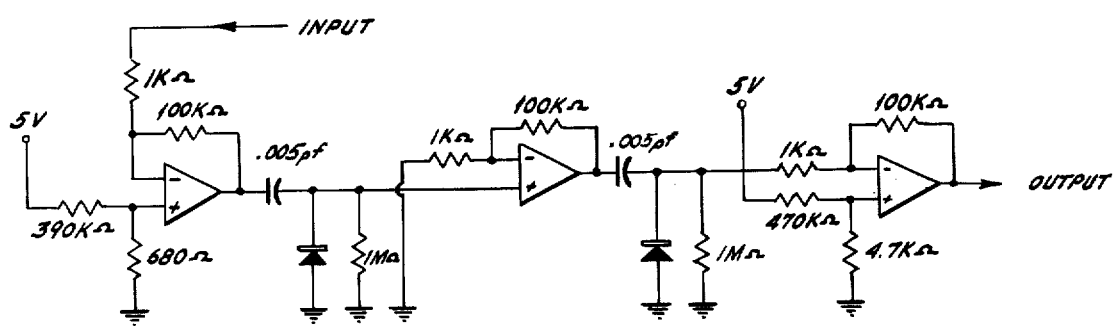
FIG. 2 is a schematic drawing, showing in detail, the amplifying means to which the first and second thermal sensor means are differentially coupled.

Referring to FIG. 2, the amplifying means 26 may be a plurality of conventional operational amplifiers capacitively coupled in series. While FIG. 2 shows three operational amplifier stages, it is anticipated by the present invention that more or less stages may be utilized in the operation of the present invention.

After a slug of air has been heated in the conduit by the pancake heater 14, the slug of air sometime later, perhaps six to eighty milliseconds later, depending on the rate of, or velocity of fluid flow, will be detected by the first thermocouple 18 and then the second thermocouple 20.

Figure 3:
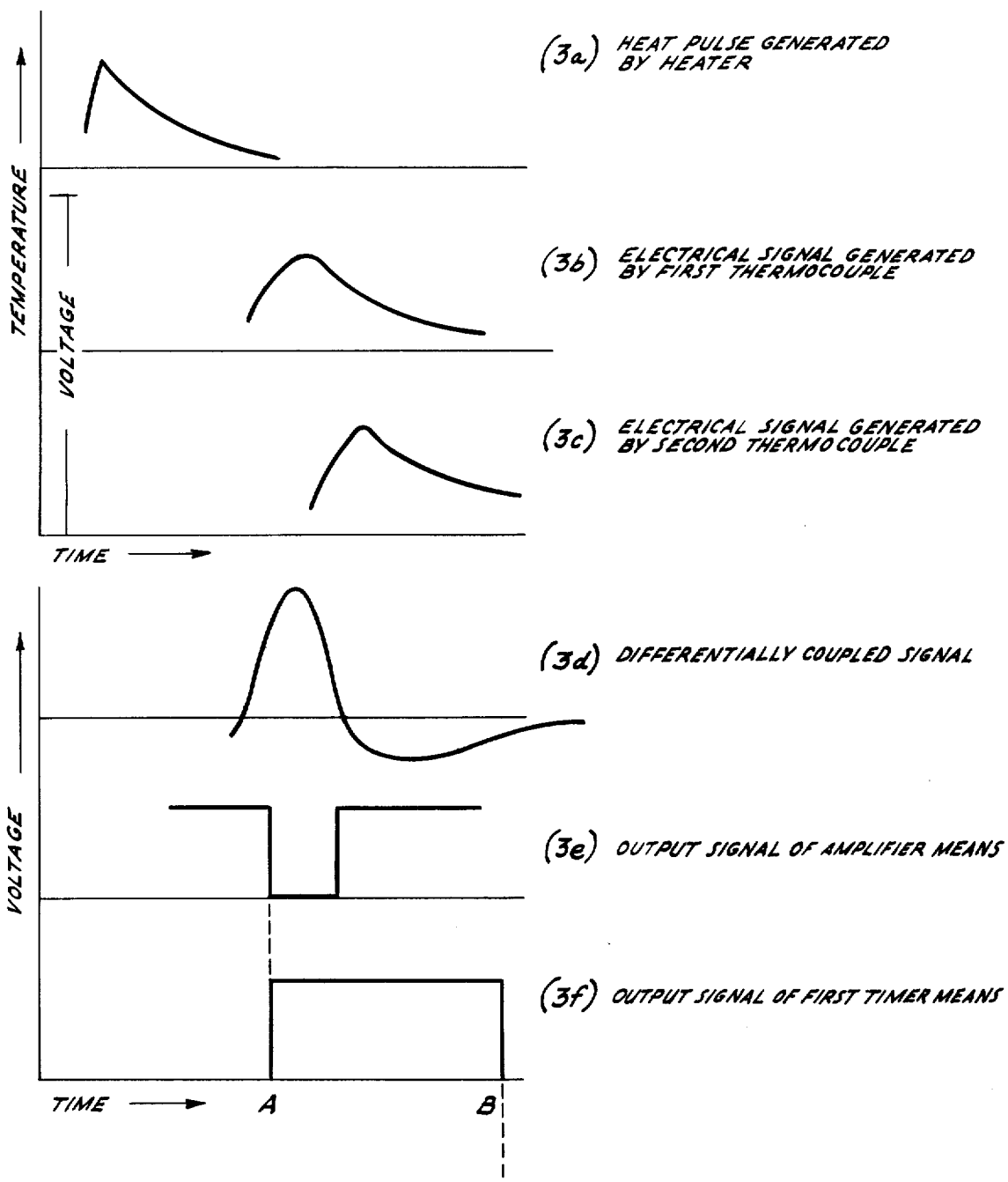
FIGS. 3(a) to 3(f) show some of the signals generated with the fluid velocity measurement system as shown in FIG. 1.

Referring to FIGS. 3 (a) to (e), the heat pulse generated by the pancake heater 14 is depicted in graph 3a as temperature versus time. The electrical signals generated by the thermocouples 18 and 20, are depicted respectively in FIGS. 3b and 3c as voltage versus time. FIG. 3d shows the differentially coupled signal of the first and second thermocouples 18 and 20 as it is transmitted to the input of the amplifier means 26. The amplifier means 26 amplifies the differential input signal to FIG. 3d and clips the top of the signal and also inverts the phase of the signal, as shown in FIG. 3e. The output signal of the amplifier means 26 is in the form of a pulse as shown in FIG. 3e. The output pulse width of the amplifier means 26 may be controlled to some degree by the distance between the first and second thermocouples 18 and 20.

The amplified pulse output signal of amplifier means 26 is then transmitted to a first timer means 28. The first timer means 28 includes a delaying circuit, which delays the transmission of an output pulse, corresponding to the amplified input pulse, for a specific period of time. The reason for this delaying period, which is built into the first timer means 28, is to give the first and second thermocouples 18 and 20 a period of time in which to cool down before their sensing another thermal wave front. If this delay period were not provided, it is possible that the thermal wave fronts would be arriving at such a rapid rate that the thermocouples could not cool down and in essence would not be capable of detecting the subsequent thermal wave fronts.

Referring to FIGS. 3e and 3f, at the point of time designated as "A" the amplified pulse of the amplifier means 26 triggers the delay period of the first timer means 28, so that the timer means 28 does not transmit a signal until the time designated as "B". FIG. 3f shows the output signal of the first timer means 28. At the time designated as "B" the first timer means emits an output pulse, usually less than one millisecond in duration, which turns on the transistor of the switching means 30, and thereby activates the pancake heater 14.

Each time the differentially coupled thermocouples 18 and 20 detect a slug of heated air the first timer means 28, after a fixed delay, triggers the pancake heater 14 into operation, thus the cycle is repeated. The time that is required for the thermal generation means 14 to heat a slug of fluid to the point in time when the heated slug of fluid is detected by the sensing means 18 and 20 is called the flight time of the heated slug of fluid. However, in this embodiment of the present invention the flight time of the heated slug of fluid also includes the delay time of the first timer means 28.

The output of amplifier means 26 is also transmitted to a counting means 32. The counting means 32 is typically an integrated circuit of conventional type capable of measuring the number of periods of time which we have designated as the flight time of the heated slug of fluid, i.e. the number of times an output has been produced by the amplifier means 26.

A second timer means 36 resets counter means 32 at a specific predetermined period of time. Thus, in the counter means 32 the measured flight times are divided into this predetermined period of time and the resulting quotient, represented as a digital count, is substantially proportional to the velocity of the fluid. The more flight times counted per predetermined period, the more resolution there will be per period. That is to say, if in a period a hundred flight times are counted, the resolution of that period is one-hundredth; while if in a period three hundred flight times are counted, the resolution of that period is one three-hundredth and consequently a better resolution. While the longer the period the greater the resolution, too long a period also has many drawbacks. Thus, there must be a compromise between resolution and the time of the predetermined period. For the purposes of describing the present invention, the predetermined period as determined by the second timer means 36 is for example, about nine-tenths of a second.

The output signal of the counter means 32 (which represents a quotient) is transmitted to a memory decoder means 34, which uses the received signal as an address for retrieving information already stored in means 34. The address is translated to the stored information which is in a form more suitable for the output. The translation is to satisfy linearity, calibration, units, etc. Typically, the memory and decoder means 34 will shape the counter signal into a binary-coded decimal form.

A latch means 38 sends the output signal of the memory-decoder means 34 to a decoder means 40 at the end of the predetermined period as determined by the second timer means 36. In the particular example of the present invention, a display means 42 for displaying the fluid velocity is of two digits, each of which is a seven-segmented numerical array, i.e., LED array or other electroluminescent device; therefore the decoder means 40 will take the binary-coded decimal signal from the memory-decoder means 34 and put it into a more useful form for operating a seven-segmented display.

Since the flight time in this first embodiment includes the delay of the first timer 28 there may be some non-linearity in the relationship of the quotient to the fluid velocity, however this can be corrected by conventional means in the memory decoder means 34.

The pulse frequency of amplified means 26 is a monotonic function of the flow velocity of the fluid. Since the frequency of the cycles is a monotonic function, the memory-decoder means 34 need only be a read-only memory device.

While both the first and second thermal sensing means 18 and 20 have been described as being disposed within the conduit 12, it is anticipated by the present invention that only one of the thermal sensing means need be in the conduit 12, i.e., in contact with that portion of the fluid flow which has been acted upon by the thermal generation means 14. The other thermal sensing means need only be as a reference, that is, it may be placed in the main stream of the fluid flow not affected by the heat of the thermal generation means 14. However, the first and second thermal sensing means must still be differentially coupled for operation of the present invention. More details of this positioning of the thermal sensing means are subsequently described in the second embodiment of the present invention.

The first embodiment of the fluid velocity measuring system of the present invention has been described with the thermal sensor means, 18 and 20 being thermocouples. However, other types of thermal sensing means can be utilized, such as thermister. As is well known to those skilled in the electrical art, a thermister is a resistive circuit component having a high negative temperature coefficient of resistance, so that its resistance decreases as its temperature increases.

Figure 4:
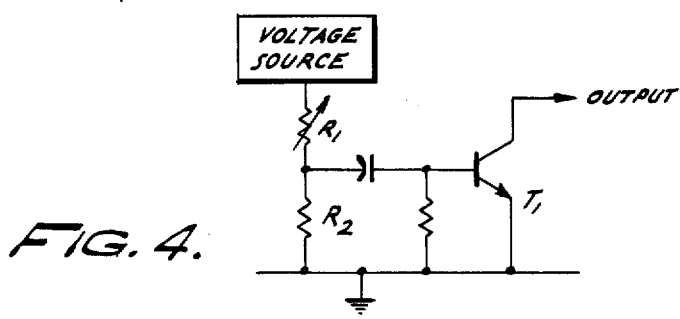
FIG. 4 is a schematic diagram of signal generation means used if the thermal sensors are thermisters.

In utilizing thermisters in the present invention, some more circuitry must be utilized for the generation of an electrical signal from each thermister. Referring to FIG. 4, such additional signal generation means is schematically described. The thermister is shown in FIG. 4 as a variable resistor designated R1. Thermister R1 is in series with a resistor R2 which has its opposite terminal at ground potential. At its opposite terminal the thermister R1 is connected to a voltage source. A transistor designated as T1 is capacitively coupled at its base terminal between R1 and R2. Thus the thermister R1 and resistor R2 are in essence a voltage divider.

In the operation of the present invention utilizing a thermister R1, when the thermister senses thermal energy its resistance decreases, and thus more voltage will be dropped across the resistor R2. This increase in voltage across R2 will either turn on the transistor T1 or increase the input voltage into the transistor T1, whereby either an output signal commences or an increased output signal will be realized at the output terminal of the transistor T1, in this case at the collector terminal.

FIG. 5 shows a possible layout of the electrical circuitry of the present invention on a printed circuit board designated as 44. The printed circuit board 44 is shown in relationship to the conduit 12 and the numerical display 42.

While the means for containing the flow of a fluid 12 has been shown as being a tube-like conduit 12, it is further anticipated that other conventional conduit designs can also be utilized with the present invention.

Referring to FIG. 6, a second embodiment of the fluid velocity measurement system is designated as 100. The second embodiment 100 is the same as the first embodiment 10 except for the positioning of the thermal sensing means and the fluid flow guide means. Second embodiment 100 includes a housing means 111 which holds all of the fluid whose velocity is to be determined. With the housing means 111 is a fluid flow guide means which is a set of partition walls designated as 170. The partition walls are spaced from one another, and are shown in FIG. 6 as being substantially flat and substantially parallel to each other. A thermal generation means 114 (the same as thermal generation means 14) is positioned between the two walls 170 at the end upstream of the fluid flow. When the thermal generation means 114 is activated by a voltage source 116 (the same as voltage source 16), a slug of the fluid flowing between the walls 170 is heated. Thus, if we look at a cross-sectional segment of the fluid flow, it is readily realized that the portion of the flow outside of the walls 170 is unheated while that portion of the flow between the walls 170 is heated by the activation of the thermal generation means 114. Furtherance, the walls 170 function as a fluid flow guide for the heated slug as does the fluid guiding means 12 in the first embodiment.

A first thermal sensing means 118 is positioned at a downstream location between the walls 170, while a second thermal sensing means 120 is positioned in the path of the unheated flow, i.e. outside of the space between the walls 170, and typically transversely or side wise to the first sensing means 118. The first and second means 118 and 120 are the same as the sensing means 18 and 20 respectively. As in the first embodiment 10, the first and second sensing means 118 and 120 are differentially coupled, and this differential output from the two thermal sensing means is sensed in the same manner by the same circuitry described with regard to the first embodiment 10 and also with regard to the third embodiment 200 subsequently described. An advantage of this embodiment of the present invention over that described is that the positional relationship between the sensors and the heated slug of fluid is not as critical. It has been discovered that if the heating of a slug of fluid is limited to a localized slug without the use of partition walls 170, the temperature distribution in the slug will not be uniform, and thus the positional relationship between the sensors and the heated slug will have to be maintained for varying flow rates. The fluid velocity measurement system of the second embodiment 100 circumvents criticality by forming a flow guide using the partition walls 170.

Referring to FIG. 7A and 7B, the temperature of a heated slug in both the X and Y directions perpendicular to the fluid flow, are therein described. Referring to FIG. 7B, it is therein shown that the temperature distribution in the heated slug in the direction perpendicular to flow and from one wall to the other wall i.e., the X direction, is very uniform downstream from the thermal generation means 114. Furthermore, referring to FIG. 7A the temperature distribution in the direction perpendicular to the flow, but along the walls, i.e., the Y direction, provides a uniform region near the sensor line. Therefore, these rather uniform temperature distributions of the heated slug in the guide formed by the walls 170, make the thermal sensor response insensitive to the sensor position. Since the fluid flow inside the guide is in communication with the fluid flow outside the guide, i.e. since there are two opened sides to the guide, thermal expansion does not change the velocity in the fluid flow direction.

While this second embodiment has been described with relation to partition walls substantially flat in shape, it is nevertheless anticipated by the present invention that the partition walls can be of other well known geometric shapes and still provide a fluid guiding capability.

Figure 8:
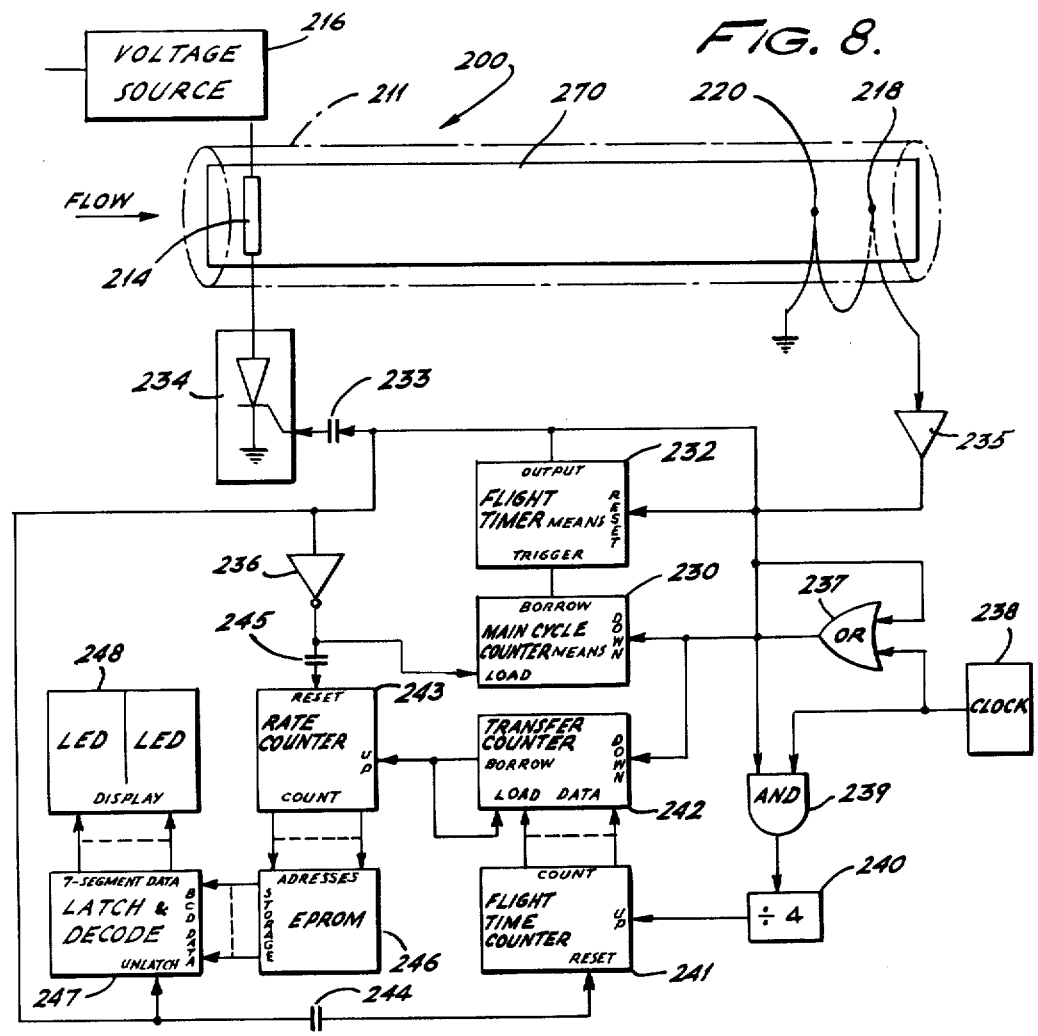
FIG. 8 is a schematic representation of the third embodiment of the fluid velocity measurement system of the present invention.

Referring to FIG. 8, a third embodiment of the fluid velocity measurement system of the present invention is designated as 200. In the third embodiment of the present invention, the repetition of thermal generations in a given time interval is simulated by the subsequently described circuitry, and specifically by a flight timer means and a flight timer counter means, without the actual firing of the heater as in the case in the first embodiment. The third embodiment of the present invention is preferable since it has the advantage in that the simulation does not have to be real time, thereby allowing better resolution to be achieved in the sampling. Like the first embodiment, the third embodiment of the present invention generates a quotient which is proportional to the fluid velocity of the fluid, however the flight time in the third embodiment is not measured in real time but is measured as a count, and likewise the predetermined period is also measured as a count.

In the third embodiment 200 of the present invention, the thermal generation means 214, and the voltage source 216, are the same as described in the first embodiment of the present invention designated as 10, while the fluid flow guide means 270, having means 211 and first and second thermal sensing means 218 and 220 are the same as described in the second embodiment 100.

The operation of the third embodiment is cyclic or repeating, and thus the starting point in the operation is arbitrarily chosen at the end of counting by the main cycle counter means 230. Set into the main cycle counter 230 is a predetermined period in the form of a count. The main cycle counter 230 is like the second timer 36 in the sense that it contains the predetermined period, but unlike the second timer 36 the period is in the form of a count, not actual time. When the main cycle counter means 230 counts down to zero from a fixed predetermined count it produces an output signal designated by the term "borrow". The "borrow" output signal triggers a flight timer means 232. The flight timer means 232 is a circuit which emits a high output when timing and is started by a trigger pulse, i.e. the borrow pulse from the main cycle counter means 230, and is stopped either by a reset pulse or by timing out.

The rise in the flight timer means output voltage charges a capacitor 233. The charging current from capacitor 233 then fires an electronic switch 234, which is typically an SCR. With the electronic switch 234 closed a pulse of current from the voltage source 216 can flow through the thermal generation means 214, which thereby heats a slug of fluid. The leading edge of the heated fluid slug, when arriving at the first thermal sensing means 218 and in cooperation with the second thermal sensing means 220 which functions as a reference detecting the thermal level of the unheated fluid, produces a differential electrical signal which is amplified by the amplifying means 235. The second thermal sensing means 220 prevents any change in total (average) fluid temperatures from being recognized as the heater signal.

The amplified signal pulse resets the flight timer 232 and the output of the flight timer means then goes to a lower voltage level, and awaits for the next trigger pulse.

The elapsed time it takes for some part of the heated fluid pulse to move from the thermal generation means 214 to the first thermal sensing means 218 and thereby produce the differential electrical signal is the period of time in which the flight timer means output is at a high voltage level. This period of time is called the flight time of the heated slug of fluid.

A signal invertor means 236 inverts the high output signal from the flight timer means 232 and thus emits a low output signal, which causes the main cycle counter means 230, through its load input, to reset to the predetermined count. At the same instance the OR gate 237 receives the high output signal from the flight timer means into one of its input. One high input signal into the OR gate 237 causes a constant high output which is received into the down input of the main cycle counter 230. Therefore, the main cycle counter 230 does not count when the output of the flight timer means 232 is at a high level, i.e., during the flight time.

When the flight timer means 232 output is at a low voltage level, a high voltage from the invertor 236 is sent to the load input of the main cycle counter 230, while the OR gate 237 permits a pulse train from the pulse train generating means 238 (hereinafter designated as the clock 238) to reach the down counting input of the main cycle counter means 230. The main cycle counter 230 now counts down at the frequency of the pulse train. When the count of the main cycle counter 230 reaches zero a "borrow" signal is again generated and the cycle repeats.

With the output from the flight timer means 232 at a high level, the AND gate 239 permits the pulse train from the clock 238 to reach the counter divider means 240. For the purpose of describing the third embodiment 200 of the present invention, the divider means 240 divides by 4 although other numbers can be used in the operation of the present invention. As will be apparent from further discussions the divider means 240 allows a high clock frequency which provides a fast sampling rate while maintaining a flight time count resolution suitable for a range of flight time durations fixed by the sensor head design requirements of the first thermal sensing means 218. These design requirements are usually the result of the sensing head requiring a period of time which to cool down to a suitable temperature for sensing a next heated slug.

During that period of time in which the flight timer means emits a high output signal the high frequency pulse train from the clock 238 is being counted by the flight time counter 241, and it is this digital representation of the flight time in the flight time counter means 241 which is the measure of the flight time. The counting stops when the output signal of the flight timer means 232 goes to a low level since the output of the AND gate 239 also goes to a low level preventing the flight counter means 241 from counting the pulse chain.

When the output signal from the flight timer 232 is at a low level the high frequency pulse chain is allowed to pass through the OR gate 237. At this time the pulse chain is emitted into the down counting input of the main cycle counter 230 as previously mentioned, and also the down counting input of the transfer counter means 242. When the transfer counter means 242 counts down to zero a "borrow" signal is generated which causes the rate counter 243 to count up by one and the count stored in the flight time counter means 241 is transferred to the transfer counter means 242. The down counting of the transfer counter 242 continues as long as the output signal from the flight timer means 232 remains low, which is that length of time determined by the main cycle counter 230. The number of times this down counting reaches zero is stored in the rate counter means 243. This number is therefore the quotient between the predetermined fixed number set into the main cycle counter means 230 and the count stored in the flight time counter means 241 which represents the flight time. This quotient is proportional to the fluid velocity when counting stops as the output of the flight timer means 230 goes to a high level. Thus, the count in the flight time counter 241 is divided into the predetermined count of the main cycle counter 230 in the transfer counter 242, and is read as a quotient in the rate counter 243.

The proportionality between the quotient in the rate counter means 243 and the fluid flow velocity may not be exactly linear. Non-linearity is typically caused by the time required to heat up the thermal generation means 214 and the first thermal sensing means 218. To lesser and controllable extent the times required to reset the rate counter means 243 and the flight time counter means 241 also effect the linearity. The flight time counter resets when the output from the flight timer means 232 goes high through the differentiating action of the capacitor 244. The rate counter resets when the output from the flight timer means 232 goes low through the conversion by invertor means 236 and differentiation by the capacitor 245. The differentiating action transforms changes in signal level to pulses of shorter duration. The reset inputs of the flight time counter means and the rate counter means 241 and 243 respectively, are made to respond to positive pulses and to ignore negative pulses.

The appropriate fluid velocity value corresponding to a quotient in the rate counter means 243, when counting is stopped by OR gae 237, is pre-stored in the erasable programmable read only memory 246 (hereinafter referred to EPROM) at the address identified by the quotient.

To save memory space the information stored in the EPROM 246 is in the form of binary coded decimal numbers (hereinafter referred to as BCD). BCD data is decoded by the latch and code means 247. The latch is unlatched when the output from the flight timer 232 is high and the rate counter means 243 is not counting. The decoded number, representing the fluid flow rate is numerically shown on the display means 248, typically LED's. The latch is latched when the output from the flight timer 232 is low and the rate counter 243 is counting. The latching holds the display means 248 constant while the rate counter means 243 is being updated.

Since the pulse train which inputs into the flight time counter means 241 is at a lower frequency than the pulse train, which inputs into the main cycle counter means 230 and transfer counter means 242, the flight time counter 241 will count at a slower rate than the counting of the main cycle counter means 230 and the transfer counter means 242. Thus, the count which represents the flight time which is stored in the flight time counter 241 is going to be a smaller number than if flight time counter 241 counted at the same rate as transfer counter 242 and the main cycle counter 230. However, since the count from the flight time counter is divided into the predetermined count of the main cycle counter 230, at the same sampling rate the third embodiment of the present invention will have an improved resolution. In furtherance, of this discussion, it is assumed that in an example of the present invention the two pulse trains generated by the clock 238 are at 640,000 Hz and at 160,000 Hz. The pulses of the slower train are counted during the flight time of the heated slug of fluid, yielding a number which is typically greater than 400. The resolution is therefore better than ±0.125 percent at this count. For a desired range of 10 to 1 this count may be 4,000. In order to maintain the ±0.125 percent resolution the quotient must be greater than 400 and the predetermined count of the main cycle counter 230 must be greater than 1,600,000. If the main cycle counter 230 counts at the 160,000 Hz rate it will take 10 seconds and the maximum sampling rate will be less than once every 10 seconds. If the main cycle counter counts at the 640,000 Hz rate the sampling rate can be four times faster. By the same reasoning, the resolution can be improved, using two pulse train frequencies, if the sampling rate is fixed. Thus, the resolution quality of the third embodiment of the present invention will be better than that of the first embodiment.

While the third embodiment of the present invention has not been described with respect to a housing means 11 and fluid flow guide means 12 as shown in the first embodiment, it is nevertheless anticipated that the circuitry of the third embodiment can be utilized incorporating these elements. Also, it is anticipated by the present invention that the circuitry of the third embodiment can be replaced by a computer or a microprocessor programmed to function as the above described circuitry.

Figure 9:
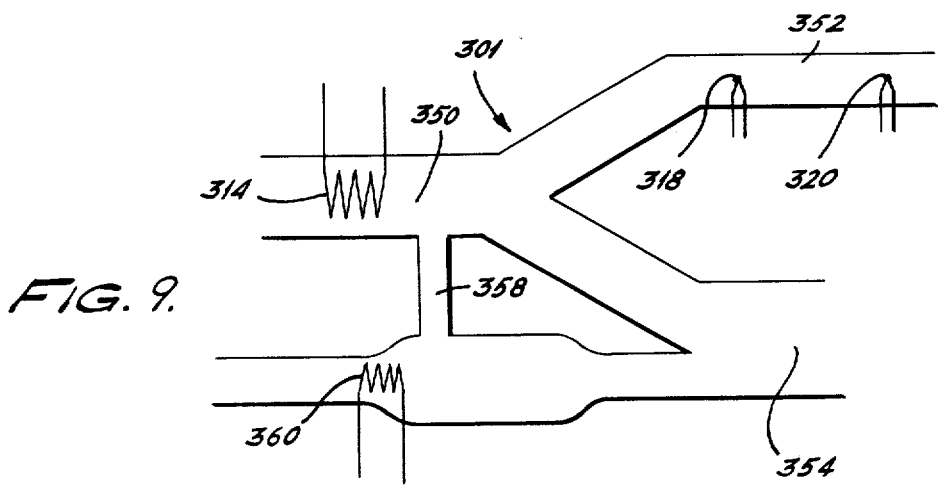
FIG. 9 is a cross-sectional view of another embodiment of means for guiding the fluid in the present invention.

Referring to FIG. 9, another embodiment of the means for guiding the fluid flow is designated as 300 and includes a housing designated as 301. The housing 301 includes a main passageway 350, for containing the fluid flow. The main passageway 350 splits off into a "Y" shape branch and into a top passageway 352 and a bottom passageway 354. A thermal generation means 314 is disposed within the main chamber 350. The thermal energy generation means 314 is essentially the same as the thermal generation means 14. A pair of thermal sensors 318 and 320 is disposed in the top passageway 352. Below the main passageway 350 is a pressure control chamber 356. The pressure control chamber extends at least upstream of the "Y" shaped branch. A control port 358 is in vertical relationship to both the main passageway 350 and control pressure chamber 356, and communicates with both the main passageway 350 and control pressure chamber 356. Disposed within the control pressure chamber 356 is a control heater 360. The control heater 360 may be of any conventional type of heater, such as a pancake heater.

The fluid heated by the thermal generation means 314 may go either into the top passageway 352 or the bottom passageway 354, depending on the pressure of the control pressure chamber 356. Generation means 314 is a constant on heater, heating the flow which normally takes the bottom branch 354. A positive chamber pressure is applied to the main passageway 350 when air in the control pressure chamber 356 is heated by the pressure control heater 360. Heater 360 is a momentary on heater. This positive chamber pressure switches the fluid heated by the thermal generation means 314 in the main passageway to the top passageway 352 where it is detected by the first and second thermal sensing means 318 and 320. Thus, the fluid in the main passageway 350 can be switched, without moving parts, to either the top passageway 352 or the bottom passageway 354. The switching time can be determined by the fluid dimensions and can be much faster than milliseconds. The pressure control heater 360 determines the switching point, but the heating rate does not determine switching speed.

The flight time of the fluid in this embodiment is the period of time it takes for the front of the heated fluid to travel from the first thermocouple 318 to the second thermocouple 320.

Although the present invention has been described in connection with specific forms thereof, it will be appreciated by one reading the preceding description of the present invention that a wide variety of equivalents may be substituted for those specific elements shown and described herein, that certain features may be used independently of other features, all without departing from the spirit and scope of this invention as defined in the appended claims.

I claim:

1. A fluid velocity measurement system comprising:
   (a) a housing means through which said fluid is caused to flow;
   (b) a fluid flow guide means disposed in said housing so that at least a portion of said fluid whose velocity is to be determined flows therethrough and is guided thereby;
   (c) a thermal generation means disposed upstream in said fluid flow guide means, and capable of operating in a short period of time to heat a slug of fluid;
   (d) a first and second thermal sensing means, being differentially coupled with each other, at least one of said sensing means being located in said guide means, said thermal sensing means adapted for emitting a differential electrical signal upon either or both sensing means detecting a heated slug of fluid, the period of time from when the thermal generation means is triggered into heating a slug of fluid to when the first and second sensing means emits a differential electrical signal defining the flight time of said heating slug of fluid;

(e) means for measuring the flight time of a heated slug of fluid and dividing said measurement into a predetermined number thereby providing a quotient which is directly proportional to the velocity of said fluid;

(f) means for receiving said quotient and converting said quotient into electrical signals for numerically displaying said fluid velocity;

(g) a flight timer means which, upon being triggered by an input signal, provides a high voltage level output signal to operate a switching means for turning on said thermal generation means for a short period of time;

wherein said means for measuring and dividing comprise pluse measuring means for measuring the number of electrical pulses at a predetermined frequency that are counted during the duration of said flight time;

wherein said pulse measuring means comprises:

(h) a flight time counter means for counting the number of electrical pulses that occur during the flight time of a heated slug of fluid;

(i) a main cycle counter means into which is set said predetermined number, said main cycle counter means further adapted to trigger said flight time measuring means at a predetermined count of said predetermined number;

(j) a transfer counter means for dividing the count of said flight time counter means into the predetermined fixed number of said main cycle counter means; and (k) a rate counter means for determining the quotient of the count of said flight time counter means divided into said predetermined fixed number.

2. The fluid velocity measurement system in accordance with claim 1 wherein, said receiving and converting means comprises:

a read only memory which receives said quotient and converts said quotient into the form of binary coded decimal signals;

a latch and decoding means for transmitting the signal of said read only memory at the end of a predetermined period of time and for reading the unlatched binary coded decimal signal and converting such signal to a signal for operating a predetermined type of display means.

3. The fluid velocity measurement system in accordance with claim 2, wherein said display means is a plurality of numerical seven-segmented electroluminescent devices.

4. The fluid velocity measurement system in accordance with claim 2, wherein said decoding means further comprises a seven-segmented driver.

5. The fluid velocity measurement system in accordance with claim 2 further comprising:

a clock means for generating a pulse train at a predetermined frequency, said pulse train determining the rate at which said main cycle counter means and said transfer counter means count down.

6. The fluid velocity measurement system in accordance with claim 5 further comprising:

a pulse train divider for reducing by a given number the frequency of said pulse train, said divided pulse train signal being received by said flight time counter so that said flight time counter counts down at a slower rate than said main cycle counter means and said transfer counter means.

7. A fluid velocity measurement system comprising:

(a) a housing means through which said fluid is caused to flow;

(b) a fluid flow guide means disposed in said housing so that at least a portion of said fluid whose velocity is to be determined flows therethrough and is guided thereby;

(c) a thermal generation means disposed upstream in said fluid flow guide means, and capable of operating in a short period of time to heat a slug of fluid;

(d) a first and second thermal sensing means, being differentially coupled with each other, at least one of said sensing means being located in said guide means, said thermal sensing means adapted for emitting a differential electrical signal upon either or both sensing means detecting a heated slug of fluid, the period of time from when the thermal generation means is triggered into heating a slug of fluid to when the first and second sensing means emits a differential electrical signal defining the flight time of said heated slug of fluid;

(e) means for measuring the flight time of a heated slug of fluid and dividing said measurement into a predetermined number thereby providing a quotient which is directly proportional to the velocity of said fluid;

(f) means for receiving said quotient and converting said quotient into electrical signals for numerically displaying said fluid velocity;

wherein the measure of said flight time corresponds to the actual time duration in which the flight time occurs;

further comprising a first timer means for receiving said differential electric signal and further constructed to delay for a predetermined period of time the transmission of a corresponding electrical signal to activate said thermal generation means, said flight time further comprising the delay of said first timer.

8. The fluid velocity measurement system in accordance with claim 7, further comprising:

a switching means electrically disposed between said thermal generation means and said first timer means, so that when said switching means is closed a current can flow through said thermal generation means thereby heating a slug of fluid.

9. The fluid velocity measurement system in accordance with claim 1, wherein said means for measuring and dividing comprises:

a second timer means into which is set said predetermined time period, a counter means for measuring the number of periods of said flight time and dividing said time into said predetermined time period thereby providing a quotient being substantially proportional to the fluid velocity, said quotient in the form of an electrical signal.

10. The fluid velocity measurement system in accordance with claim 9, wherein said means for receiving and converting said quotient comprises:

a memory and decoder means for translating the quotient signal of said counting means to forms suitable for output;

a latching means for transmitting the signal of said memory means at the end of a predetermined period of time specified by said second timer means; and a decoding means for reading the memory means signal as transmitted by the latching means and thereby transmitting a signal adapted for operating a display means.

11. The fluid velocity measurement system in accordance with claim 10, wherein said display means comprises a plurality of numerical seven-segmented electroluminescent devices.

12. The fluid velocity measurement system in accordance with claim 10 further comprising:

an amplifying means for receiving a differential electrical signal from said first and second thermal sensing means and being constructed to emit an amplified electrical pulse corresponding to said received differential electrical signal.

13. The fluid velocity measurement system in accordance with claim 12, wherein said amplifying means is a plurality of operational amplifiers capacitor coupled in series.

14. A fluid velocity measurement system comprising:
(a) a housing means through which said fluid is caused to flow;
(b) a fluid flow guide means disposed in said housing so that at least a portion of said fluid whose velocity is to be determined flows therethrough and is guided thereby;
(c) a thermal generation means disposed upstream in said fluid flow guide means, and capable of operating in a short period of time to heat a slug of fluid;
(d) a first and second thermal sensing means, being differentially coupled with each other, at least one of said sensing means being located in said guide means, said thermal sensing means adapted for emitting a differential electrical signal upon either or both sensing means detecting a heated slug of fluid, the period of time from when the thermal generation means is triggered into heating a slug of fluid to when the first and second sensing means emits a differential electrical signal defining the flight time of said heated slug of fluid;
(e) means for measuring the flight time of a heated slug of fluid and dividing said measurement into a predetermined number thereby providing a quotient which is directly proportional to the velocity of said fluid;
(f) means for receiving said quotient and converting said quotient into electrical signals for numerically displaying said fluid velocity;
wherein said fluid flow guide means comprises a pair of spaced-apart walls located in said housing means, said thermal generation means being disposed upstream between said walls, said walls being adapted as a flow guide to the heated fluid slug, said first thermal sensing means being disposed downsteam between said walls for sensing said heated slug, and said second thermal sensing means being disposed substantially side wise to said first sensing means for sensing unheated fluid flow in said housing means.

15. The fluid velocity measurement system in accordance with claim 14, wherein said walls are substantially flat in shape and substantially parallel to each other.

16. A fluid velocity measurement system comprising:

(a) a housing means, through which said fluid is caused to flow;
(b) a fluid flow guide means located in said housing means, through which flows at least a portion of said fluid whose velocity is to be determined;
(c) a thermal generation means disposed upstream in said fluid flow guide means, and capable of heating the flow of fluid therethrough;
(d) a first and second thermal sensing means, being differentially coupled, both of said sensing means being located in said guide means, said thermal sensing means adapted for emitting a differential electrical signal upon both sensing means differentially detecting a heated slug of fluid, the period of time from when the first thermal sensing means detects said heated fluid to the time when said second thermal sensing means detects the heated fluid being the flight time of said heated fluid flow;
(e) means for measuring the flight itme of a heated fluid flow and dividing said measurement into a predetermined fixed number thereby providing a quotient which is directly proportional to the velocity of said fluid;
(f) means for receiving said quotient and converting said quotient into electrical signals for numerically displaying said fluid velocity;

and wherein said fluid guiding means comprises:
(i) a main passageway through said housing having a "Y" shaped branch which branches off into a top and a bottom passageway;
(ii) a pressure control chamber below said main passageway and extending at least upstream of said "Y" shaped branch;
(iii) a control port substantially vertically disposed with respect to and in communication with said main passageway and said passageway and said pressure control chamber;
(iv) a control heater disposed in said pressure control chamber, said thermal generation means being disposed in said main passageway, and said first and second thermal sensing means being disposed in said top passageway, one of said thermal sensing means being disposed farther downstream in said top passageway than said other thermal sensing means, the pressure in said pressure control chamber, as the result of activation or non-activation of the control heater, determining whether the fluid flowing through said main passageway will be switched to said top or bottom passageway; fluid heated by the thermal generation means being capable of being detected in said top passageway by said thermal sensing means when fluid flows into said top passageway.

17. A fluid velocity measurement system comprising:
(a) a fluid flow guide means through which flows at least a portion of said fluid whose velocity is to be determined;
(b) a thermal generation means disposed upstream in said fluid flow guide means, and capable of operating in a short period of time to heat a slug fluid;
(c) a first and second thermal sensing means, being differentially coupled with each other, at least one of said sensing means being located in said guide means, said thermal sensing means adapted for emitting a differential electrical signal upon either or both sensing means detecting a heated slug of fluid, the period of time from when the thermal generation means is triggered into heating a slug of fluid to when the first and second sensing means emits a differential electrical signal defining the flight time of said heated slug of fluid;

(d) means for measuring the flight time of a heated slug of fluid and dividing said measurement into a predetermined number, thereby providing a quotient which is directly proportional to the velocity of said fluid;

(e) means for receiving said quotient and converting said quotient into electrical signals for numerically displaying said fluid velocity;

(f) a flight timer means which upon being triggered by an input signal provides a high voltage level output signal to operate a switching means for turning on said thermal generation means for a short period of time;

wherein said means for measuring and dividing comprise pulse measuring means for measuring the number of electrical pulses at a predetermined frequency that are counted during the duration of said flight time and wherein said pulse measuring means comprises a flight time counter means for counting the number of electrical pulses that occur during the flight time of a heated slug of fluid, a main cycle counter means into which is set said predetermined number, said main cycle counter means further adapted to trigger said flight time measuring means at a predetermined count of said predetermined number, a transfer counter means for dividing the count of said flight time counter means into the predetermined fixed number of said main cycle counter means, and a rate counter means for determining the quotient of the count of said flight time counter means divided into said predetermined fixed number.

18. The fluid velocity measurement system in accordance with claim 17 wherein said receiving and converting means comprises:

a read only memory which receives said quotient and converts said quotient into the form of binary coded decimal signals;

a latch and decoding means for transmitting the signal of said read only memory at the end of a predetermined period of time and for reading the unlatched binary coded decimal signal and converting such signal to a signal for operating a predetermined type of display means.

19. The fluid velocity measurement system in accordance with claim 18, wherein said display means is a plurality of numerical seven-segmented electroluminescent devices.

20. The fluid velocity measurement system in accordance with claim 18, wherein said decoding means further comprises a seven-segmented driver.

21. The fluid velocity measurement system in accordance with claim 18 further comprising:

a clock means for generating a pulse train at a predetermined frequency, said pulse train determining the rate at which said main cycle counter means and said transfer counter means count down.

22. The fluid velocity measurement system in accordance with claim 21 further comprising:

a pulse train divider for reducing by a given number the frequency of said pulse train, said divided pulse train signal being received by said flight time counter so that said flight time counter counts down at a slower rate than said main cycle counter means and said transfer counter means.

23. A fluid velocity measurement system comprising:

(a) a fluid flow guide means through which flows at least a portion of said fluid whose velocity is to be determined;

(b) a thermal generation means disposed upstream in said fluid flow guide means, and capable of operating in a short period of time to heat a slug of fluid;

(c) a first and second thermal sensing means, being differentially coupled with each other, at least one of said sensing means being located in said guide means, said thermal sensing means adapted for emitting a differential electrical signal upon either or both sensing means detecting a heated slug of fluid, the period of time from when the thermal generation means is triggered into heating a slug of fluid to when the first and second sensing means emits a differential electrical signal defining the flight time of said heated slug of fluid;

(d) means for measuring the flight time of a heated slug of fluid and dividing said measurement into a predetermined number, thereby providing a quotient which is directly proportional to the velocity of said fluid;

(e) means for receiving said quotient and dividing said quotient into electrical signals for numerically displaying said fluid velocity, wherein said flight time corresponds to the actual time duration in which the flight time occurs, said measurement system further comprising a first timer means for receiving said differential electrical signal and further constructed to delay for a predetermined period of time the transmission of a corresponding electrical signal to activate said thermal generation means, said flight time further comprising the delay of said first timer.

24. The fluid velocity measurement system in accordance with claim 23, further comprising:

a switching means electrically disposed between said thermal generation means and said first timer means, so that when said switching means is closed a current can flow through said thermal generation means thereby heating a slug of fluid.

25. A fluid velocity measurement system comprising:

(a) a fluid flow guide means through which flows at least a portion of said fluid whose velocity is to be determined;

(b) a thermal generation means disposed upstream in said fluid flow guide means, and capable of operating in a short period of time to heat a slug of fluid;

(c) a first and second thermal sensing means, being differentially coupled with each other, at least one of said sensing means being located in said guide means, said thermal sensing means adapted for emitting a differential electrical signal upon either or both sensing means detecting a heated slug of fluid, the period of time from when the thermal generation means is triggered into heating a slug of fluid to when the first and second sensing means emits a differential electrical signal defining the flight time of said heated slug of fluid;

(d) means for measuring the flight time of a heated slug of fluid and dividing said measurement into a predetermined number, thereby providing a quotient which is directly proportional to the velocity of said fluid;

(e) means for receiving said quotient and dividing said quotient into electrical signals for numerically displaying said fluid velocity, wherein said fluid flow guide means is located within a housing means constructed to contain the flow of all of the fluid whose velocity is to be determined, and wherein said fluid flow guide means comprises a pair of spaced apart walls located in said housing means, said thermal generation means being disposed upstream between said walls, said walls being adapted as a flow guide to the heated fluid slug, said first thermal sensing means being disposed downstream between said walls for sensing said heated slug, and second thermal sensing means being disposed substantially sidewise to said first sensing means for sensing unheated fluid flow in said housing means.

26. The fluid velocity measurement system in accordance with claim 25, wherein said walls are substantially flat in shape and substantially parallel to each other.

27. A fluid velocity measurement system comprising:
 (a) a fluid flow guide means through which flows at least a portion of said fluid whose velocity is to be determined;
 (b) a thermal generation means disposed upstream in said fluid flow guide means, and capable of heating the flow of fluid therethrough;
 (c) a first and second thermal sensing means, being differentially coupled, both of said sensing means being located in said guide means, said thermal sensing means adapted for emitting a differential electrical signal upon both sensing means differentially detecting a heat slug of fluid, the period of time for when the first thermal sensing means detects said heated fluid to the time when said second thermal sensing means detects the heated fluid being the flight time of said heated fluid flow;
 (d) means for measuring the flight time of the heated fluid flow and dividing said measurement into a predetermined fixed number thereby providing a quotient which is directly proportional to the velocity of said fluid;
 (e) means for receiving said quotient and converting said quotient into electrical signals for numerically displaying said fluid velocity;
and wherein said fluid guiding means comprising:
 (f) a housing means;
 (g) a main passageway through said housing having a "Y" shaped branch which branches off into a top and bottom passageway;
 (h) a pressure control chamber below said main passageway and extending at least upstream of said "Y" shaped branch;
 (i) a control port substantially vertically disposed with respect to and in communication with said main passageway and said pressure control chamber;
 (j) a control heater disposed in said pressure control chamber, said thermal generation means being disposed in said main passageway, and said first and second thermal sensing means being disposed in said top passageway, one of said thermal sensing means being disposed farther downstream in said top passageway than said other thermal sensing means, the pressure in said pressure control chamber, as the result of activation or non-activation of the control heater, determining whether the fluid flowing through said main passageway will be switched to said top or bottom passageway;
 (k) fluid heated by the thermal generation means being capable of being detected in said top passageway by said thermal sensing means when fluid flows into top passageway.

* * * * *